UNITED STATES PATENT OFFICE.

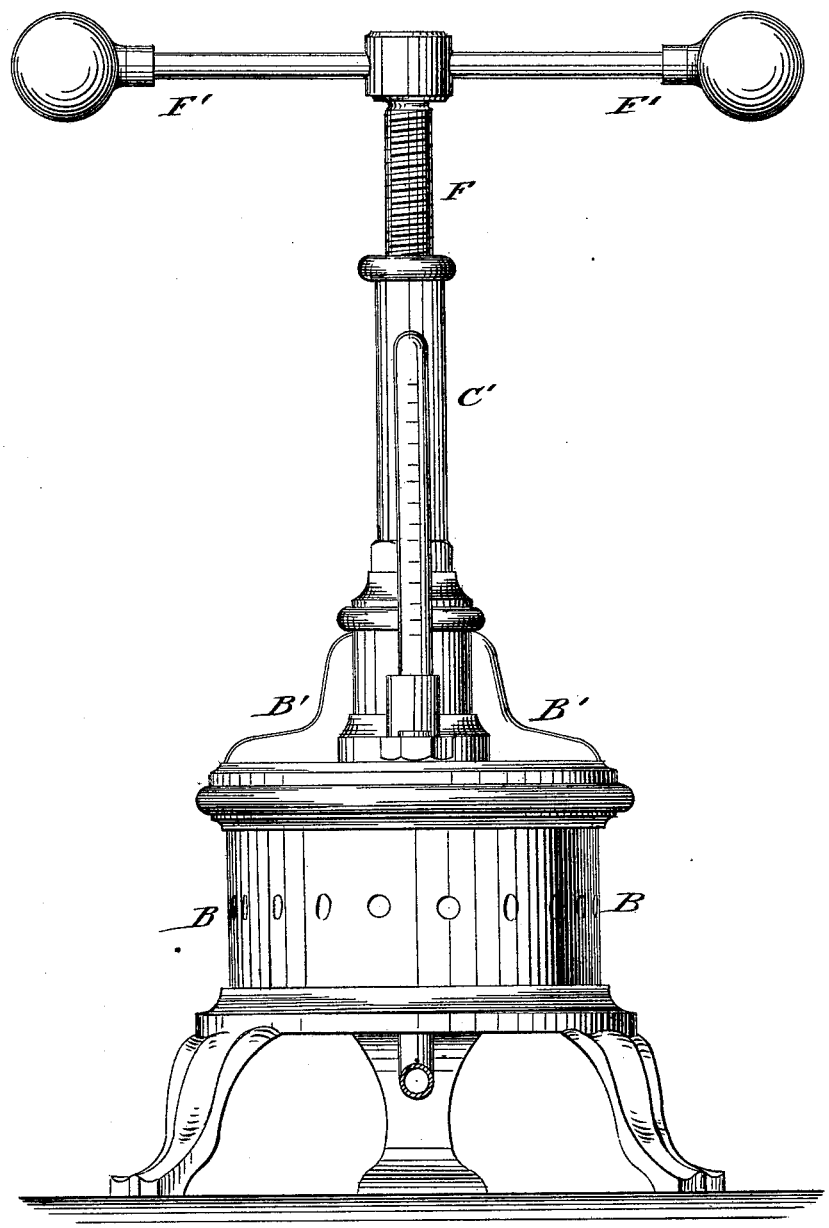

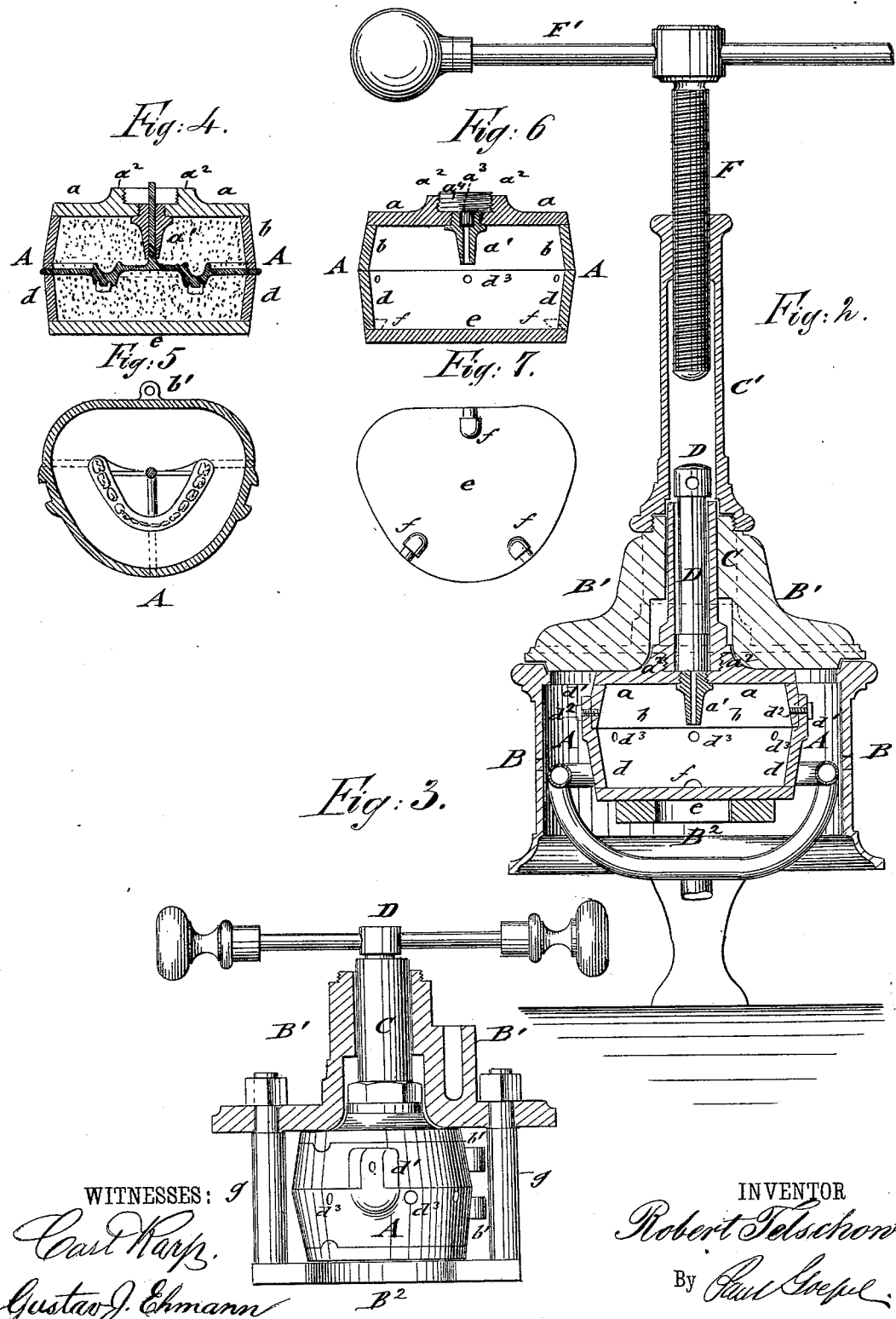

ROBERT TELSCHOW, OF BERLIN, PRUSSIA, GERMANY.

METHOD OF AND APPARATUS FOR MAKING DENTURES.

SPECIFICATION forming part of Letters Patent No. 231,375, dated August 17, 1880.

Application filed December 17, 1879. Patented in Germany June 24, 1879.

*To all whom it may concern:*

Be it known that I, ROBERT TELSCHOW, of the city of Berlin, Kingdom of Prussia, German Empire, have invented an Improved Method and Apparatus for Making Dentures, of which the following is a specification.

This invention has reference to improvements in the well-known method of forming dentures from rubber, celluloid, or other plastic material in a plaster-of-paris mold. This method, though variously improved, has still some defects which prevent a reliable and accurate working of the same. These defects can, however, be partly ascribed to the imperfect apparatus employed, which stood in the way of the entire success of the method.

A main objection to the formation of a good denture is to be found in the plaster-of-paris mold, which heretofore was formed in one piece around the porcelain teeth and around the wax base, which was molded around the same. The wax base was fixed in the flask (cuvette) by means of metallic pins, then the plaster-of-paris cast around the same, and after the setting of the latter the wax removed by heating the flask. The teeth were then held in position by the plaster-of-paris mold and the cavity filled with rubber or celluloid by a kind of force-pump or syringe. But this mode of making the mold did not admit of any inspection of the teeth after the wax had been removed by melting, so that it frequently happened that the teeth in the mold had shifted from their original positions, and that the denture was entirely unfit for use. This irregularity was enhanced by the method of molding the base and forcing the plastic material into the same. The base was molded so that the edges of the teeth were uppermost, which had the effect that the teeth were held suspended in the mold and could easily drop or change their place. By another method the plastic material was forced in sidewise, so that the teeth which were held by the plaster mold were liable to be removed from their proper places by the pressure of the mass.

These defects are intended to be obviated by the following method of molding the base and forcing in the plastic material, which consists, first, in making the plaster-of-paris mold of two parts, instead of one, setting then the teeth into the lower half of the mold, and forcing in the plastic material through a channel in the upper half of the mold.

The invention consists, secondly, in an improved apparatus for molding the wax base, for heating and forcing in the plastic mass, and for using the same finally for vulcanizing the base, as will appear more fully hereinafter, and be finally pointed out in the claims.

Referring to the drawings, which illustrate my invention, Figure 1 represents a side elevation of my improved apparatus for making dentures. Fig. 2 is a vertical central section of the same; Fig. 3, a side view of the flask and clamp, shown as detached from the apparatus for removing the piston. Figs. 4 and 5 are a vertical transverse section and a horizontal section of the flask, with the denture shown in position therein. Fig. 6 is a vertical central section of the flask as modified for forming and vulcanizing rubber bases, and Fig. 7 is a top view of the bottom plate of the flask with its projecting teats or studs.

Similar letters of reference indicate corresponding parts.

The apparatus consists, essentially, of three main parts: first, of the molding-flask; secondly, of the force-pump or syringe; and, thirdly, of a furnace for heating the flask and vulcanizing the base.

The molding-flask A consists of a top plate, $a$, an upper ring, $b$, a lower ring, $d$, and a bottom plate, $e$. The top plate, $a$, and the upper ring, $b$, as well as the bottom plate, $e$, and lower ring, $d$, form open cup-shaped bodies having a slight outward flare. They are connected by means of upwardly-extending and perforated ears or lugs $d'$ of the lower section, which enter recesses of the upper ring, and by screws $d^2$, which enter through holes of the ears into holes of the ring $b$, as shown in Fig. 2.

The lower cup, $d\ e$, is of greater height than the upper cup, and provided near its edge with exit-holes $d^3$, while the upper cup is provided with a central downward-extending nozzle, $a'$, which is either made in one piece therewith or screwed into the same.

For the proper setting and adhering of the plaster-of-paris mold to the flask the top and bottom plates, $a$ and $e$, are provided, respectively, with undercut teats or projections $f$, as shown in Figs. 6 and 7.

The forming of the mold is accomplished as follows: In the plaster-of-paris cast of the gum for which the denture is to be made is placed a base of rubber or wax, into which the artificial teeth are embedded. This plaster cast forms later on a portion of the top part of the mold. Through this plaster cast and the layer of rubber and wax is bored, near the center of the arch or roof connecting the gum, a hole, into which a thin wire is inserted. This wire leaves afterward in the plaster-of-paris mold a channel for the entrance of the plastic material. The upper cup is then filled, after being placed with the top down, with liquid plaster-of-paris and the cast pressed quickly into the mass, so that the projecting wire passes into the nozzle $a'$. When the plaster has hardened it is cut off, so as to be level with the edge of the cup. The wire is then withdrawn, the surface oiled, and the upper section of the mold is finished.

The lower section of the mold is formed as follows: The nozzle is first closed with a plug of wax and the lower ring placed on the upper ring. Thin wires are then introduced through the holes of the ring and secured with wax to the base formed of the rubber or wax. The ring $d$ is then filled up all around the wax base and the wires with liquid plaster-of-paris, and finally closed by the bottom plate, $e$. As soon as the plaster-of-paris has set the flask is heated up by immersion in hot water, and thereby the wax base melted and the wires then readily removed. The teeth are retained in their proper positions by the lower cup—a fact which can be quickly ascertained by separating the cups at the oiled surface. This feature is of fundamental importance, as it enables the dentist to observe the teeth and to ascertain positively whether they are in their proper places or whether there are cavities in the mold—in other words, it enables him to discover and remove in time every irregularity which might prevent the formation of a good denture. This is impossible in the old method, as in the same a mold of one piece is used.

The plaster-of-paris embeds itself around the projecting teats of the top and bottom plates and retains them thereby in position. The flask is also provided at the outside, besides the connecting ears, with perforated projections $b'$, having interior screw-threads, into which a rod is screwed, which serves as a handle for immersing the flask into hot water for melting the wax.

The side channels which have been formed in the mold by the wires serve as exit-channels for the superfluous plastic material after the same has been forced in through the nozzle and has filled up entirely the interior cavity and the interstices between the teeth. After the teeth have been securely set into the mold the wax is removed and the flask A placed into the furnace B in such a manner that the top plate, $a$, is uppermost. This is accomplished by screwing first into an exterior threaded collar, $a^2$, of the top plate the press-cylinder C of the syringe, and placing then the cast-iron cover B' of the furnace B in position on the flask. The cover B' is connected by two screw-bolts, $g$, with a bridge, B², which extends below the bottom of the flask, and holds the same, together with the cover, securely in position. In the press-cylinder C is guided a solid piston, D, the enlarged head of which is again guided in a cylindrical extension, C', which is screwed to the upper part of the cover B'. A pressure-screw, F, with a handle, F', works in the upper threaded portion of the extension C' and forces the piston D downward, and thereby the plastic material which is placed into the press-cylinder, through the nozzle $a'$ into the mold, after the whole has been heated first to the proper temperature. As the nozzle extends down to the cavity of the mold, it prevents any part of the mold being broken off by the entering mass and carried along with it so as to be molded into the base or connecting roof.

The heating of the flask is accomplished in the furnace by a gas-burner made of arc-shaped side sections and of a transversely-connecting lower section, as shown in Fig. 2. The burner-sections are perforated to form a large number of gas-jets. The side sections heat up the sides, the lower burner-section the bottom of the flask. Before being exposed to the heat of the burner the flask is heated in warm water.

The plastic mass in the press-cylinder is heated by the heat transmitted by the cover B', which receives its heat directly from the side jets of the burner. A thermometer placed into a socket of the cover indicates the temperature of the same.

In place of a gas-burner the furnace may be heated with an alcohol, petroleum, or any other burner, the construction of the side and bottom sections of the same being adapted to the substance to be burned. As soon as the thermometer indicates a temperature of 125° centigrade the pressure-screw is slowly turned downward and the plastic material forced from the cylinder into the mold. When a temperature of 130° centigrade is reached the flame is extinguished and the piston forced down until the surplus material passes out at the side holes of the flask. Should it appear at one hole only this hole has to be closed by a plug until the mass is emitted through the remaining holes. The turning of the screw is then discontinued, the flask and syringe removed from the oven, the extension-tube screwed off, and the piston then removed from the cylinder by inserting through a transverse hole in its head a cross-rod with end knobs, as shown in Fig. 3. The flask is then cooled off in cold water, and finally the denture removed by opening the flask, to be finished in the customary manner.

By unscrewing the press-cylinder C the rigid mass may be readily removed, which is also a point of superiority of my apparatus as compared to those heretofore in use, in which the removing of the mass was connected with some difficulty.

For making the base of the lower denture a special method of forming is used, which is clearly illustrated in Figs. 4 and 5. This base has in its finished state the form of a horseshoe.

To facilitate the forcing in of the plastic mass to the cavity of the base a flat connecting cavity is formed on a level with the inner edge of the base, or slightly above the same, by means of a thin wax plate, which is melted away after the mold is cast. The nozzle reaches down into this cavity, and the plastic mass can distribute itself uniformly over the entire base. The connecting-plate of celluloid, which has formed itself by pressing in the mass, is finally detached from the base. In this manner the molding of the base of the lower denture is accomplished in analogous manner to that of the upper denture, and without any danger of breaking off and mixing any small pieces of plaster with the mass.

Owing to the difference in height of the upper and lower rings of the flask-sections, higher and lower dentures can be made in one flask by simply exchanging the rings. In case the higher ring is used in the upper part a longer nozzle has to be screwed into the top plate.

When india-rubber is employed for the denture a temperature of from 90° to 100° centigrade is sufficient. For other materials the proper degree of heat has to be determined experimentally.

The forcing in of the rubber is accomplished in the same manner as described for celluloid.

The rubber base is vulcanized in the flask after having been formed by the syringe.

By experiments I found it to be of great advantage to vulcanize the rubber base under pressure. This is accomplished by the use of a top plate, $a$, the nozzle of which has an enlarged or socket portion, $a^3$, at the center of the threaded collar $a^2$, as shown in Fig. 6. Into the collar and socket fits a screw-plug, $a^4$, with a center stud or pin. After the cylinder is unscrewed from the top plate this screw-plug is inserted therein, so that the stud is forced into the enlarged portion of the nozzle. The exit-holes of the lower ring are also closed by screw-plugs, and the rubber then vulcanized in the compressed state, the result being a stronger and more durable denture than one obtained by the ordinary method.

The essential feature of my improved method is the uniform distribution of the plastic mass throughout all the parts of the mold without any displacement of the teeth. The escape of the mass through several openings diminishes the pressure and prevents the danger of breaking off portions of the mold. The construction of the mold admits of inspection before forcing in the plastic mass, so that in every case and without fail a strong and durable denture is obtained.

Having thus described my invention, I claim as new and desire to secure by Letters Patent—

1. The method herein described of molding the bases of dentures, consisting in making the mold of two separable sections, securing the teeth into the lower sections, and forcing in the plastic material through a center channel of the upper section, substantially as set forth.

2. The method herein described of molding the bases of dentures, consisting in arranging in the center of the mold a downwardly-extending supply-channel and distributing the plastic mass from the same to all parts of the denture, substantially as described.

3. In an apparatus for making dentures, a flask made of a top plate, a bottom plate, and two intermediate and interchangeable side rings of different height, substantially as set forth.

4. In an apparatus for making dentures, a flask having top and bottom plates with undercut teats or projections, for the purpose set forth.

5. In an apparatus for making dentures, a flask the upper and lower rings of which have exterior screw-sockets for screwing in a handle-rod, as described.

6. In an apparatus for making dentures, a flask the top plate of which is provided with a central downwardly-extending nozzle, substantially as set forth.

7. In an apparatus for making dentures, the combination of a flask having a central downwardly-extending nozzle with a press-cylinder screwed into a top socket of the flask, so as to be detachable for removing the surplus material, substantially as specified.

8. In an apparatus for making dentures, the combination of flask A, having a central nozzle, with a press-cylinder, C, a supporting-cover, B′, and a bottom bridge, B², an interior piston, D, a tubular extension, C′, and a pressure-screw, F, all as and for the purpose set forth.

9. In an apparatus for making dentures, the combination of a flask having a central nozzle with a force-pump or syringe above the nozzle, and with an encircling furnace the burners of which are so arranged as to impart a direct heat to the flask and an indirect heat to the plastic material in the syringe, substantially as specified.

10. In an apparatus for making dentures, the combination of a flask having a central interior nozzle, said nozzle having an enlargement or socket at the upper part, with a screw-plug having a stud or pin fitting into the socket, for the purpose of compressing the plastic mass in the mold, substantially as set forth.

In testimony whereof I have signed my name to this specification in the presence of two subscribing witnesses.

ROBERT TELSCHOW.

Witnesses:
EDWARD P. MACLEAN,
CARL FEHLERT.